March 8, 1960 R. R. WAER 2,927,965

AUTOMATIC PHASING SYSTEM FOR MULTICHANNEL PULSE CODE MODULATION SYSTEMS

Filed July 15, 1953 4 Sheets-Sheet 1

INVENTOR
RICHARD R. WAER
BY [signature]
ATTORNEY

March 8, 1960 R. R. WAER 2,927,965

AUTOMATIC PHASING SYSTEM FOR MULTICHANNEL PULSE CODE MODULATION SYSTEMS

Filed July 15, 1953 4 Sheets-Sheet 2

INVENTOR
RICHARD R. WAER
BY Percy P. Lantzy
ATTORNEY

March 8, 1960 R. R. WAER 2,927,965

AUTOMATIC PHASING SYSTEM FOR MULTICHANNEL
PULSE CODE MODULATION SYSTEMS

Filed July 15, 1953 4 Sheets-Sheet 3

INVENTOR
RICHARD R. WAER
BY Percy P. Lantzy
ATTORNEY

March 8, 1960 R. R. WAER 2,927,965

AUTOMATIC PHASING SYSTEM FOR MULTICHANNEL PULSE CODE MODULATION SYSTEMS

Filed July 15, 1953 4 Sheets-Sheet 4

INVENTOR
RICHARD R. WAER
BY [signature]
ATTORNEY

United States Patent Office 2,927,965

Patented Mar. 8, 1960

2,927,965

AUTOMATIC PHASING SYSTEM FOR MULTICHANNEL PULSE CODE MODULATION SYSTEMS

Richard R. Waer, Easton, Pa., assignor to International Telephone and Telegraph Corporation, a corporation of Maryland Application July 15, 1953, Serial No. 368,027

14 Claims. (Cl. 179—15)

Figures 1, 2B:
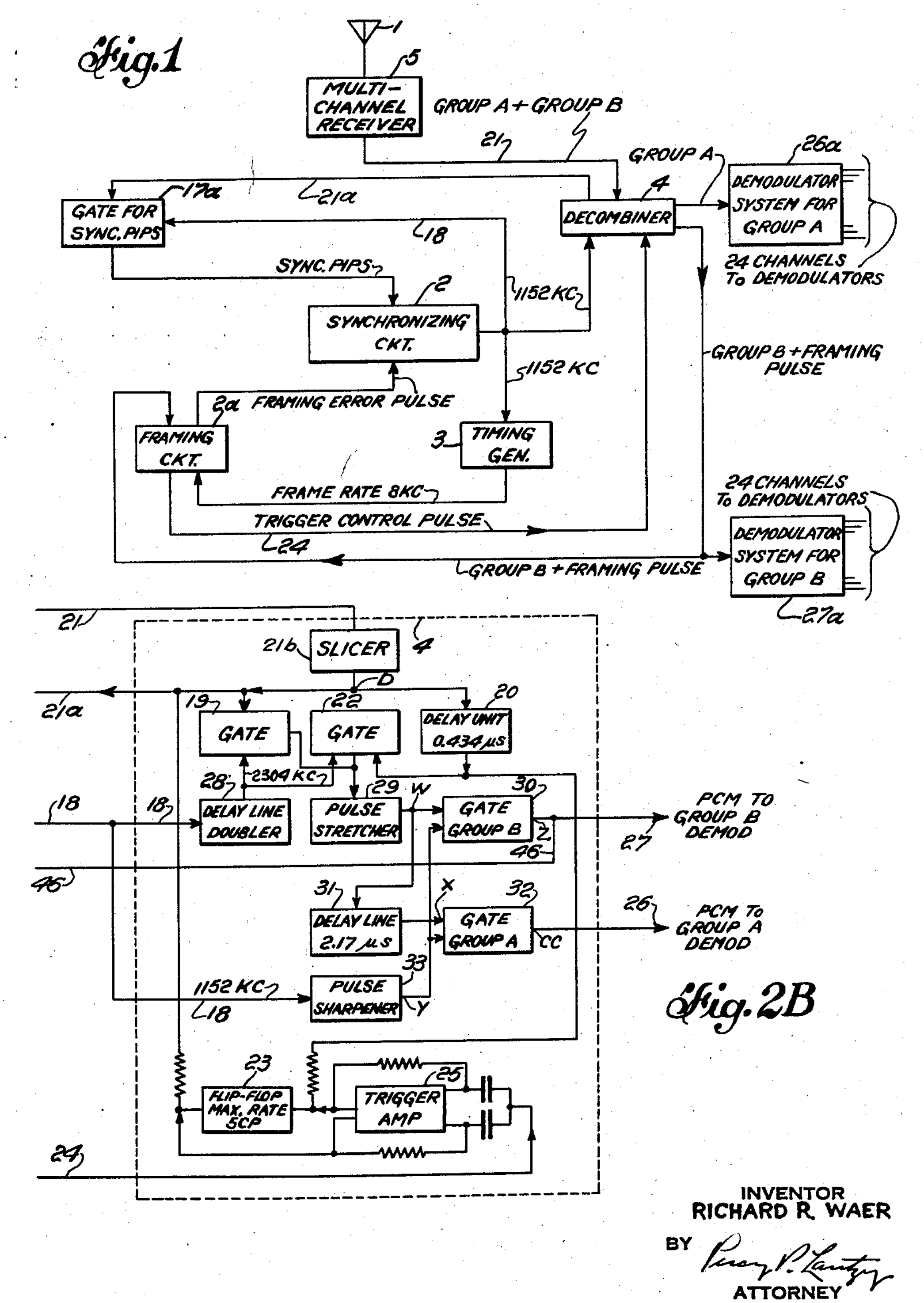

This invention relates to multichannel pulse communication systems and more particularly to a system for automatically controlling at a receiving terminal the phase relation of channel signals according to respective channel output connections.

It is known in the prior art that the transmission of the framing information for phasing a PCM demodulator with the distant modulator may be accomplished by employing a synchronizing or "winking" pulse. The winking pulse is one pulse per frame, usually a least weight pulse so that the channel from which the pulse is borrowed is still useable, and is made to occur in alternate frames. This half-frame-rate pulse is thus in a known time relationship with respect to all remaining pulses, and is therefore distinctive.

Heretofore, the system of recognition consisted of examining each pulse position, a particular time allotment where pulses may or may not be present in a given PCM code, for a definite interval of time, for example a number of frames, and deciding whether or not this particular pulse-position contained the framing or winking pulse on the basis of whether or not a half-frame-rate resonant circuit built up beyond a specified voltage level.

Desirable recognition has two characteristics which are mutually incompatible in the above recognition system, they being speed of recognition and accuracy of recognition. These desired characteristics in the above means of recognition may be respectively achieved by a low Q recognition tank and a high Q recognition tank, but never simultaneously.

The required accuracy of recognition in the above-mentioned system may be greatly increased if any of the channels are to be used for a general type of input rather than voice only. Thus, if tone telegraphy or any other carrier type system is to be sent on one or more of the channels, the low-resolution spectrum analysis performed by the recognition tank is liable to indicate a component in the spectrum of one or more of the various weight pulses. For example, a strong 1010 c.p.s. carrier would cause the second from least weight pulse to have a strong component only 40 c.p.s. from the center frequency of the recognition tank in a system using an 8 kc. sampling or frame-rate pulse. Thus, for reliable recognition in a PCM system carrying unspecified signals in its channels, it is necessary to go to a relatively high Q tank and the resultant slow rate analysis. Therefore, it is an object of this invention to provide a phasing or synchronizing system which has both accuracy and speed of recognition.

A feature of this invention is the comparison of the synchronously winking pulse with a locally generated synchronous sampling or frame-rate pulse. This system provides the equivalent advantages of a variable optimum Q in that recognition is certain despite near-synchronous false pulses, effectively an infinite Q circuit, and yet rapid for unmodulated or randomly modulated pulses, effectively a low Q circuit. These advantages may be obtained generally in the following manner by this invention. Since it is known that the framing pulse is successively on and off in consecutive frames, the pulse is under examination frame by frame for recognizing this condition. The very first time of non-coincidence between the pulse under examination and the locally generated frame-rate pulse is taken as evidence of incorrect framing and results in rejection of this pulse position and initiation of the sampling of the next adjacent pulse position. Since only either the presence or the absence of the pulse can be correct in any one sampling, and since the relationship between pulses in a given position between successive frames is either unchanging or essentially random, the alternating requirement for framing means that on the average about two samplings or frame intervals will be required to reject a given pulse position. Since a certain phase, on or off to start with, is implied by the use of a locally generating half-frame-rate pulse begun at an arbitrary time, it may be necessary to slip completely around two frames in the most undesirable case. However, on the average one frame of slippage will be required to properly phase the demodulator with the distant modulator and this will be accomplished in the number of frame intervals equal to about twice the number of pulses per frame. The time required to accomplish the framing may be calculated by the following relationship: Time in seconds=number of frames of slippage×channels per frame×pulses per channel×loops per pulse×seconds per loop. An example of the average time required to achieve framing employing this phasing system in a 48 channel, 64 level PCM system employing 8 kc. sampling pulses is: Time in seconds=1 frame of slippage×48 channels per frame×6 pulses per channel×2 loops per pulse×1/8000 second per loop=0.072 second.

Another feature of this invention is a free choice of attack time by the framing circuits. For example, during the framing process it is desirable to be able to reject a pulse position rapidly to speed the search process, but once framing has been established it is desirable to slow down the rejection process so that a noise burst or pulse cannot throw the system out of frame. In the present invention a detector or delayed bias circuit is provided which by varying a time constant can provide delays ranging from zero to seconds or more if desired. Such a delay circuit could be employed in the framing or recognition circuits of prior art with the disadvantage that the minimum delay is established by the Q of the recognition tank.

A further feature of this invention is the circuitry by which synchronizing pulses are derived from the incoming plural channel group diplexed PCM signal for application to the synchronizing circuits to establish the synchronized base frequency employed in the system of this invention. The derived synchronizing pulses are also employed in the separator or decombiner unit to separate the group diplexed PCM signal for presentation of the plural channels of each group or simplex portion of the PCM signal to their respective demodulators. Further, one of the output channels of the separator unit containing the framing information may be coupled to the framing circuit for comparison with the frame-rate pulses to accomplish proper synchronization.

Another feature of this invention is the timing generator which is activated by the synchronized base frequency from the synchronizing circuit for production of the frame-rate pulse which is employed for comparison with pulses of either a selected PCM pulse group or the pulses of the received train. The input to the timing generator is altered in accordance with the output from the framing circuit to produce slippage in time of the frame-rate pulse in such a manner as to provide synchronized framing with respect to the received synchronizing pulses.

Figure 2A:
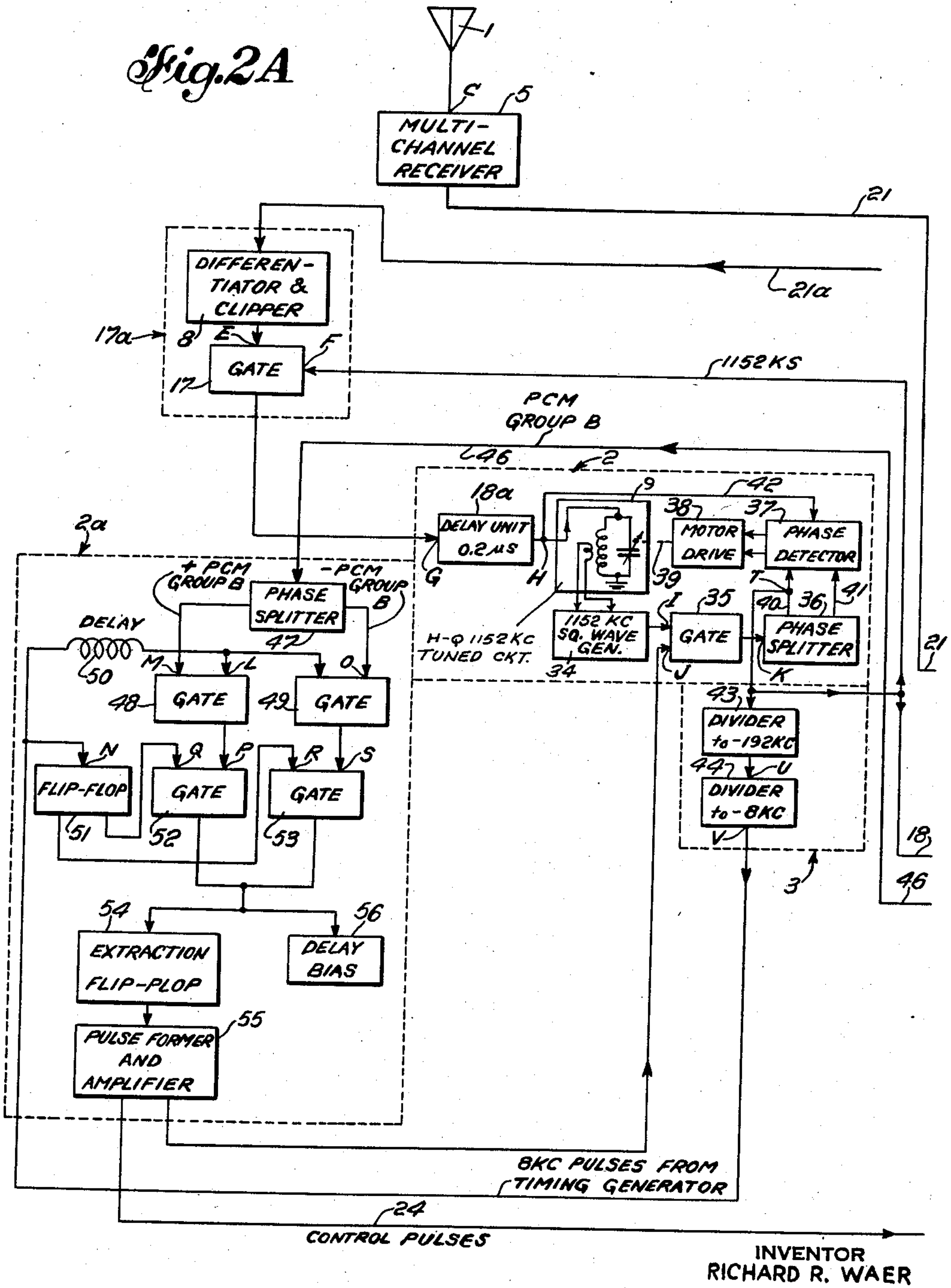
Figure 3A:
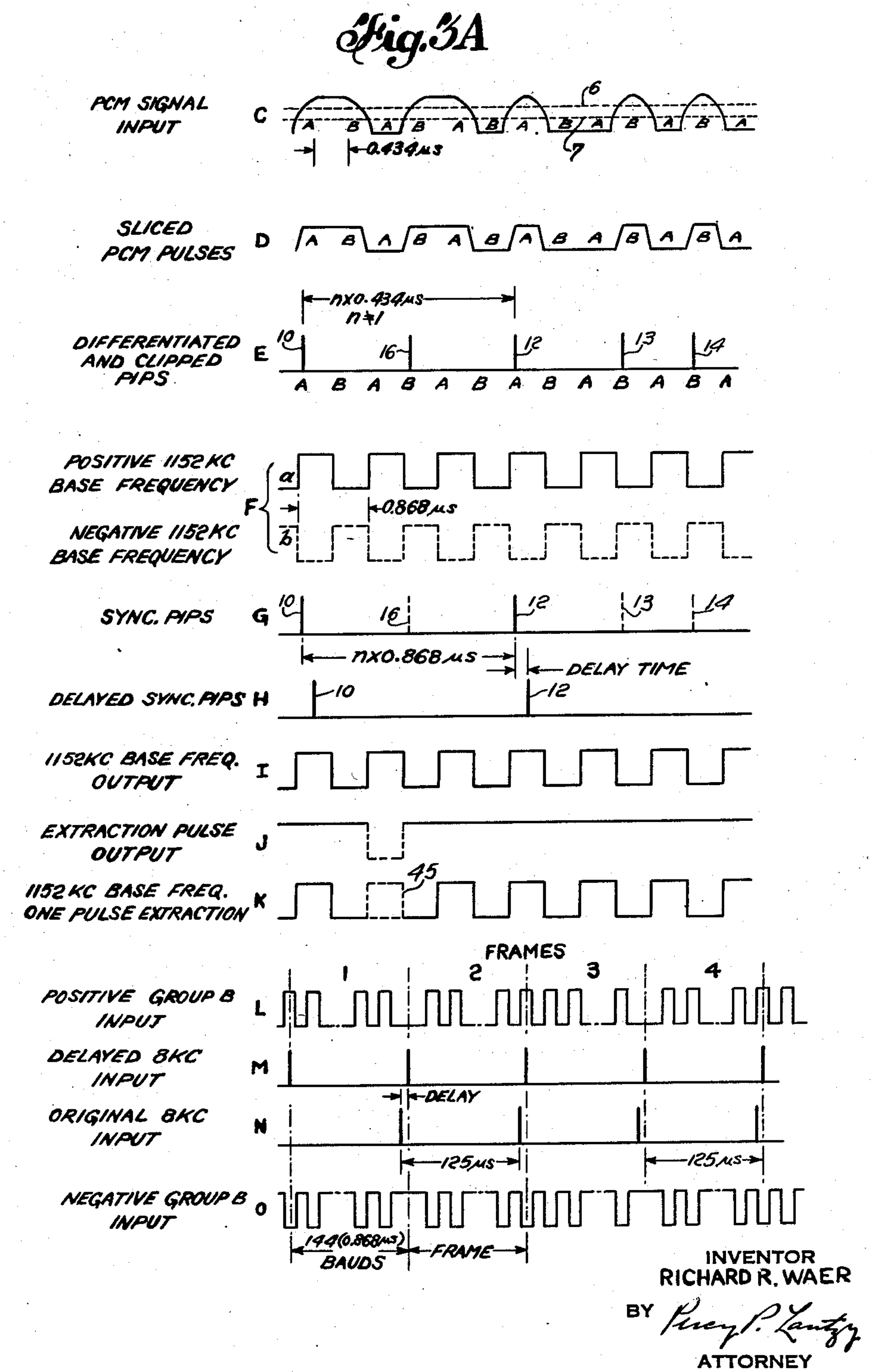
Figure 3B:
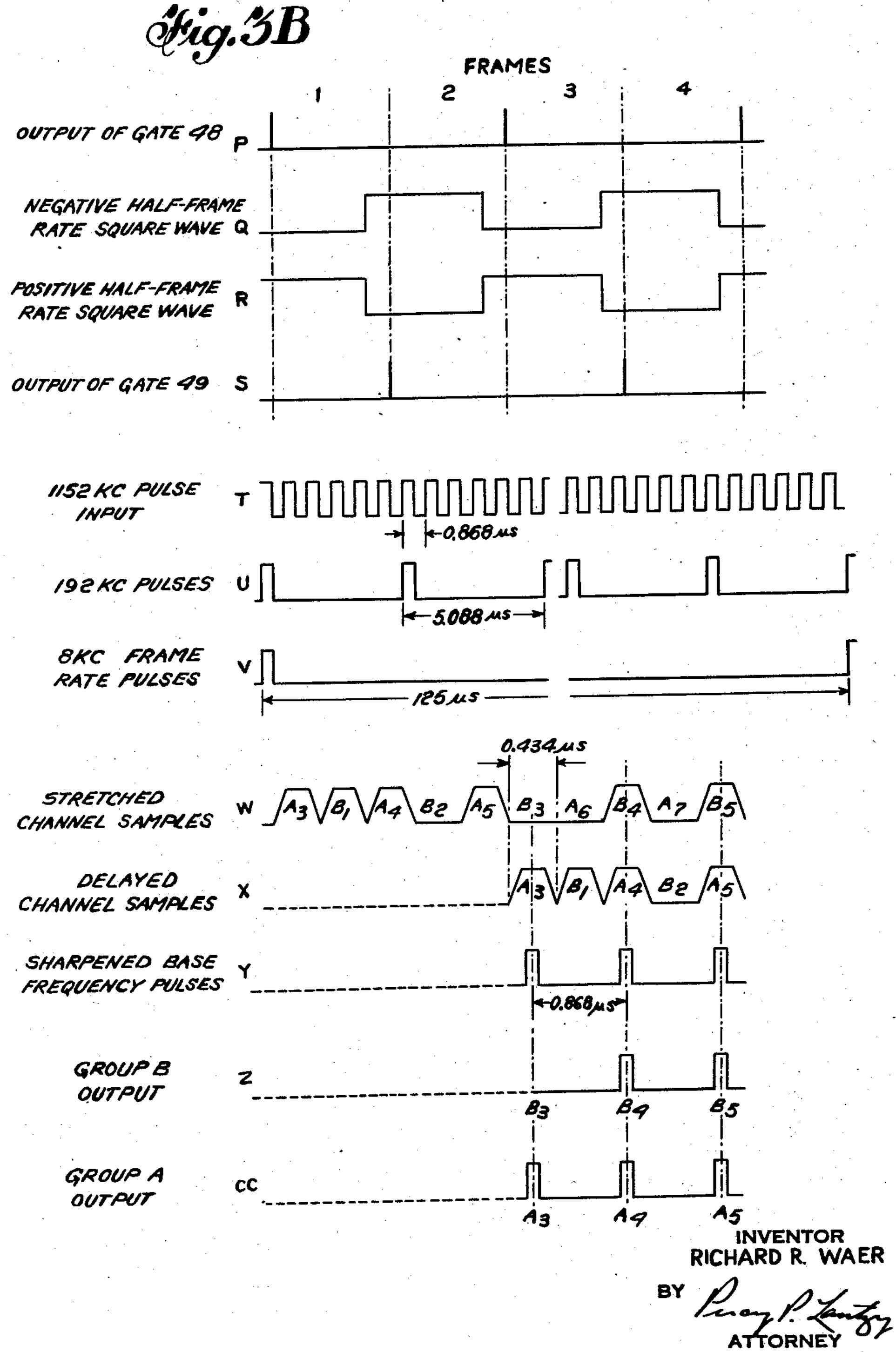

The above-mentioned and other features and objects of this invention will become more apparent by reference to the following description taken in conjunction with the accompanying drawings, in which:

Fig. 1 illustrates a blocked diagram of the phasing system in accordance with the principles of this invention; Figs. 2A and 2B illustrative an expanded block diagram of Fig. 1; and Figs. 3A and 3B illustrative substantially the wave-forms present at various indicated points in the phasing system of Figs. 2A and 2B.

Referring to Fig. 1, the incoming signal to the demodulator from the radio link at antenna 1 may consist of any number of interleaved PCM channels, but for explanation purposes and for employment with the preferred embodiment of this invention a 48 channel PCM pulse train will be considered. An example of a typical input pulse signal envelope at antenna 1 is illustrated in Curve C of Fig. 3 where the code element pulses are substantially Gaussian in shape and have a certain amount of overlap as indicated therein. This signal is then reshaped or regenerated by amplitude clipping or slicing in slicer 21*b* followed by time sampling to remove noise and other forms of interference. The threshold input peak signal-to-peak noise ratio of the preferred embodiment has been measured at approximately 6 db.

The 48 channel pulse train is formed at the transmitting terminal by two groups of 24 channels designated group A and group B. Each channel of the channel grouping includes six pulse positions for the six element binary code group being employed therein for purposes of explanation. The channels of each group are interleaved on a time basis. Thus, the six code elements of channel 2 will follow in time the six code elements of channel 1 and so forth for the remainder of the channels of the channel group. This provides two groups of 24 channels with the code elements of each channel being directly adjacent each other. The 48 channel pulse train is formed from these two channel groups by time displacing one channel group with respect to the other channel group, for example, a delay of five pulse positions, and interleaving the channel groups such that individual code elements of a channel of one channel group have disposed therebetween an individual code element of a channel of the other channel group. It should be further pointed out that to synchronize the reception of this 48 channel pulse train only one of the channel groups need to be modified to provide the "winking" pulse in one of the pulse positions of a selected channel. At the receiving terminal the channel groups are separated one from the other and the time displacement imparted to the one channel group is counteracted to place the channel groups in time coincidence for conduction of the channel groups to their respective demodulator systems 26*a* and 27*a* for recovery of the modulation carried in the individual channels of each channel group. By proper synchronized separation of the two groups of channels, no further synchronizing means is required in the demodulation circuits. This synchronized separation is accomplished by decombiner 4 under influence of various timed signals as described in detail hereinafter.

The first step in phasing the receiving terminal with the transmitting terminal is to obtain a base frequency at the receiving terminal which is synchronized with the base frequency at the transmitting terminal. For purposes of illustration, assume that the adjacent pulse positions of the received wave are 0.434 microsecond apart. This yields a pulse position repetition frequency for the received wave of approximately 2304 kc. This is twice the base frequency of the receiving terminal since the interleaving of the pulse positions of the two channel groups actually reduced the spacing between adjacent pulses of a channel group by two. Thus, the base frequency to be produced at the receiving terminal for frequency synchronization is 1152 kc. This base frequency is extracted from the received signal by cooperation between synchronizing circuit 2 and gating means 17*a*. The base frequency output of circuit 2 controls the operation of timing generator 3 which produces the locally generated frame rate pulse (8 kc.).

The second step in phasing the receiving terminal with the transmitting terminal is to obtain a time coincidence or framing between the output of generator 3 and the proper pulse positions of the received signal. This is accomplished by coupling the received signal to decombiner 4 where the interleaved channel groups are separated for routing to their respective demodulator systems 26*a* and 27*a*. The channel group containing the framing or "winking" pulse is coupled to framing circuit 2*a*. The framing pulse is selected by gating circuits, triggered by the 8 kc. signal of generator 3, included in framing circuit 2*a* in a manner to maintain the required time relationship between the various timing pulses of the system generated by generator 3. If time coincidence is not present, the required time relationship is established by operating on the generation of the base frequency pulse output of circuit 2.

Thus, a demodulator phasing system is employed herein which comprises a synchronizing circuit 2 and a framing circuit 2*a* to properly phase the PCM demodulator with the distant modulator. The synchronizing circuit is activated by the received signals and the framing circuit 2*a* is activated by the channel group containing the framing pulse and the frame rate output of timing generator 3. An indication of synchronization is obtained when the base frequency of the demodulator is made identical with that of the modulator. An indication of framing is obtained when the various timing outputs of generator 3 are aligned in a time relationship with the proper incoming pulse positions. The framing circuit 2*a* examines the incoming PCM signal at a given time. If the pulse position examined is not the framing pulse, extraction circuits of circuit 2 and 2*a* are operated for removal of one 1152 kc. pulse from the output of circuit 2. This latter unit generates the 8 kc. frame-rate or sampling pulses required in the framing operation, and is controlled by the 1152 kc. base frequency from the synchronizing circuit 2.

When one pulse is removed from the output of circuit 2, the frame-rate or sampling pulses from the timing generator 3 slip one pulse position and the next adjacent pulse position of the received signal is examined. This extraction and slipping process continues until the framing pulse is examined, recognized, and the extraction circuits are disabled. Further, from the framing circuit 2*a* a control pulse is fed to the decombiner 4 to operate the selector circuits which couple group A channels to demodulator system 26*a* and the group B channels to demodulator system 27*a*.

Referring to Figs. 2A and 2B, an expanded block diagram of Fig. 1 is illustrated. Known circuits are employed in a distinctive combination to provide synchronizing circuit 2, framing circuit 2*a*, timing generator 3, and channel group separator 4. The synchronizing and framing circuits 2 and 2*a* synchronize the base frequency of the demodulator with that of the modulator and assure that the edges of locally generated base frequency pulses bear a fixed time or phase relation to the edges of the incoming PCM pulses for framing. The timing generator 3 generates the basic timing pulses required for operation of the entire phasing equipment, and specifically for the generation of the 8 kc. frame-rate pulses utilized in the framing operation. The decombiner 4 regenerates the Gaussian-shaped code element pulses received from the radio link by antenna 1 and receiver 5 to remove noise accumulated during transmission, to provide a signal for the synchronizing circuit 2 via the gating means 17*a* for production of the 1152 kc. basic timing waveform, to separate the PCM signal into two groups of 24 PCM channels, applying these groups to their respective demodulators, to provide the 24 channel group containing the framing information inserted at the modulator for utilization in the framing circuit 2a, and to switch the two 24 channel groups between the two PCM demodulator systems until group A signals are routed to demodulator 26a and group B signals to demodulator 27a.

In carrying the detailed description of Figs. 2A and 2B forward, it will be necessary to refer to the waveforms shown in Figs. 3A and 3B wherein the letters employed for the various curves appear in Figs. 2A and 2B at the point of occurrence. The 48 channel incoming signal having a pulse shape substantially as shown in Curve C is received by antenna 1 for coupling to the receiver 5 including known radio frequency circuitry. The output of receiver 5 is coupled via conductor 21 to an adjustable signal slicing arrangement 21b present at the input of decombiner 4. The slicer 21b presents to the remainder of decombiner 4 and gate 17a square wave pulses or slices removed from the central portion of the incoming pulses regardless of average amplitude changes in the signal pulse. Such an output is illustrated in Curve D wherein the pulses are derived from the signals of Curve C between the predeterminedly adjusted levels 6 and 7.

The resultant sliced PCM pulses of Curve D is coupled by conductor 21a to differentiator and clipper 8 for amplification, differentiation and clipping to produce positive pips corresponding to every leading edge of the discrete pulses present in the PCM pulse train. Since these pips are produced by 48 channel full width PCM having a pulse position width of 0.434 microsecond, they will be spaced by an integral number, except one, times 0.434 microsecond, as indicated in Curve E. These "48 channel" pips are not as yet suitable for use directly in the 1152 kc. high Q tuned circuit 9 in the synchronizing circuit 2 because, in order to ring the tuned circuit 9 in a definite polarity, the ringing pulses must be separated by an integral number times 0.868 microsecond, the period of the 1152 kc. base frequency, as indicated in Curve G by pips 10 and 12. To remove the incorrect pips from Curve E, such as pips 13, 14 and 16, the 48 channel pips of Curve E are applied to the control grid of gate 17. An 1152 kc. square wave signal, as shown in Curve F(*a*), is also applied to the control grid of gate 17 through conductor 18 from the output of synchronizing circuit 2. As a result of a coincident gating operation, the signal out of the gate 17 now contains only those pips which are spaced by an integral number of 0.868 microsecond periods, as indicated in Curve G. This gating operation removes the influence of the undesired pulses 13, 14 and 16 of channel group B, allowing channel group A to provide the activation for the synchronizing operation.

However, due to the random or freedom of attack time in the framing circuit 2a and in the extraction of 1152 kc. base frequency, it is possible to have an 1152 kc. square wave signal of opposite polarity, as indicated at Curve F(*b*), removing the channel group A pips 10 and 12 of Curve E and allowing the channel group B pips 13, 14 and 16 to provide the activation for the synchronizing operation. While either situation is suitable for operation of this system the remaining description of the phasing system will be continued assuming that the condition in Curve F(*a*) is present wherein the pips 10 and 12 will be the controlling or synchronizing pips for ringing tuned circuit 9.

The channel group A pips are spaced by an integral number of 0.868 microsecond periods and may be called "24 channel" pips since they are pips in the same relation as would be produced by differentiating and rectifying 24 channel PCM pulses. Since these pips are now suitable for use in the synchronizing circuit 2, they are amplified and translated to a low impedance level in gate unit 17 for impressing upon delay unit 18a disposed in the synchronizing circuit 2. Delay unit 18a functions to establish the proper timing of the 1152 kc. square wave, indicated in Curve F(*a*) or its duplicate in Curve I, with respect to the synchronizing pips of Curve G. In other words, the pips 10 and 12 shown in Curve G are delayed in order that the derived 1152 kc. square wave signal will be centered for sampling purposes upon said pips. The results of this delaying operation may be observed in Curves G, H, and I, in that order. These centered pips ring the tuned circuit 9 to produce an oscillatory output. This output is further modified, by associated circuits as described hereinafter, to produce the basic timing signal of 1152 kc. for synchronizing a 48 channel system.

The output of slicer 21b, Curve D, besides cooperating in establishing synchronizing pips, is coupled directly to gate 19 and the delay unit 20. The pulse train of Curve D is delayed by the width of a 48 channel pulse position 0.434 microsecond, by delay unit 20, and this delayed output is applied to gate 22. In operation, gate 19 or 22 is turned on by a five cycle per second flip-flop 23. Thus, the condition of flip-flop 23 influences the timing of the 48 channel PCM signal coupled to the remaining portions of the terminal equipment by the width of a 48 channel pulse position. The need for this control delay arises from the indetermination as to which set of channel group pips will be suppressed by gate 17a in the original production of the synchronizing pips for application to the tuned circuit 9. Since on the average, the 48 channel PCM signal contains as many pulses in channel group A as in channel group B, it is possible for the 1152 kc. signal to be derived from the leading edges of the channel group A pulses in one operating condition and from channel group B pulses in the other opertaing condition. This, in turn, means that the timing of the 1152 kc. square wave base signal may be shifted by 0.434 microsecond from one period of operation to the next and as a result there arises an incorrect separation of the groups by the sampling process unless an equal shift in the received signal is provided. This desirable shift is provided by the delay unit 20 and is keyed in and out by flip-flop 23 indirectly through gate 22. Flip-flop 23 is doubly stable, and is triggered from one condition to the other by control pulses arriving from the framing circuit 2a through conductor 24. These control pulses are applied to the trigger amplifier 25 which comprises two amplifier sections, the output of one section being applied to one side of flip-flop 23 and the other amplifier section being applied to the other side of flip-flop 23, the control pulses being amplified by only one section at a time dependent upon the condition of flip-flop 23. Only that section of trigger amplifier 25 needed to trigger flip-flop 23 into the opposite condition is on at any one time. Flip-flop 23 is of known configuration with the components therein selected to have values which enable it to be triggered at only a five cycle per second rate regardless of the rate of arrival of the control pulses.

The circuits just described alternately switch in and out of the path of the output of the slicer 21b, for 0.1 second intervals, the delay of 0.434 microsecond until framing is accomplished. In other words, channel group A signal is switched between demodulator A and demodulator B at 0.1 second intervals, while group B signal is simultaneously switched between demodulator B and demodulator A. The 0.1 second interval is to allow sufficient time for the framing operation to be completed, the conduction of channel groups A and B to their respective demodulator systems with proper phase relationships. As soon as framing is established, control pulses cease and the delay unit 20 remains in its last condition, either in or out of the circuit.

To attain the signal-to-noise ratio advantages of PCM with the system under consideration, the incoming minimum bandwidth signal must be regenerated by sampling both the time and amplitude. The amplitude sampling is performed by slicer 21b, resulting in the output signal, Curve D, which is essentially a narrow slice of the incoming signal, Curve C, between reference levels 6 and 7.

The time sampling portion of the pulse regeneration is carried out in either gate 19 or 22, whichever may be turned on by flip-flop 23. The narrow 2304 kc. pulses employed to key the gates 19 and 22 are generated from the basic 1152 kc. square wave, present on the conductor 18, by the doubler unit 28 having a combination of known circuit configurations to integrate and amplify the basic 1152 kc. square wave to produce an 1152 kc. sawtooth. The peaks of this sawtooth wave are then retained and amplified. The resultant narrow 1152 kc. pulses are coupled to an open-circuited delay line having sufficient length to reflect each 1152 kc. pulse applied thereto in a manner to provide at the input of the delay line a signal wave of narrow pulses having a 2304 kc. rate. These pulses are then amplified and fed to the coincident gates 19 and 22.

The output signals of the gates 19 and 22 are connected to a common pulse stretcher 29 which widens the narrow samples from gates 19 and 22 to full pulse position width again, substantially as indicated by the partial pulse train indicated in Curve W. This 48 channel pulse train is then routed to gate 30 and the delay line 31. The delay line 31 provides a 2.17 microsecond or a five pulse position delay to compensate for the five pulse position delay introduced at the transmitter to interleave channel groups A and B for transmission. Curve X illustrates the delay imparted by delay line 31 to provide proper alignment between the pulses of the two groups for separation from the 48 channel PCM signal for application to their respective demodulators. The delayed pulses of Curve X are then coupled to gate 32. Gates 30 and 32 are coincident gates. It is, therefore, necessary to provide a sampling or keying pulse to produce the desired separation of the interleaved channel groups. The sampling pulses derived from the basic 1152 kc. square wave, present on conductor 18, are coupled to the pulse sharpener 33 which produces the pulses shown in Curve Y having a repetition rate of 0.868 microsecond. Due to the synchronization that has been achieved and the slight delay present in pulse sharpener 33 these sampling pulses will be aligned with the Curves W and X as indicated. This proper alignment of the three curves or waveforms provide for the separation of the interleaved channel groups into the channel group pulse trains as indicated in Curves Z and CC. The pulse positions of each channel group now occupy their proper time position relative to each other and are in the proper sequence, that is, synchronization and framing has been accomplished and the individual channel groups may be conducted to their respective demodulator systems through terminals 26 and 27, respectively. The output of gate 30, channel group B, contains the framing information applied thereto at the transmitting terminal. Besides being coupled to terminal 27, the output of gate 30 is also coupled to the framing circuit 2*a* via conductor 46. Thus the desired functions of regeneration of the received pulse signals and decombination of the interleaved channel groups are performed by the decombiner 4. The decombiner 4 also functions to provide synchronizing and framing information from the received signal for operation thereon by the associated circuits of the phasing system.

The framing operation will now be discussed in detail. The positive pips from the gate 17, as shown in Curve G are coupled to synchronizing circuit 2. These pips have a position in time corresponding to the positive-going or leading edges of the combined PCM pulses which are coincident with the base frequency. Therefore, the maximum possible pulse rate is 1152 kc. These pips are obtained, as described hereinabove, by differentiating the incoming PCM. The pips are differentiated for the purpose of increasing the relative energy at 1152 kc. and are passed from the gating means 17*a* to delay unit 18*a* prior to application to the high Q tuned circuit 9 which extracts the 1152 kc. fundamental component.

Since the incoming PCM has been clipped in the slicer 21*b*, any noise present on the received signal will appear as time modulation on the synchronizing pips 10 and 12 of Curve G and causes phase modulation of the 1152 kc. sine wave output of the tuned circuit 9. To reduce this effect, a temperature-controlled quartz crystal may be used for the tuned circuit 9, resulting in extremely high Q.

The 1152 kc. since wave is coupled from the tuned circuit 9 to an 1152 kc. square wave generator 34 to form a square wave output substantially as shown in Curve I for application to the input of the timing generator 3 and the conductor 18 through gate 35 and a low impedance phase splitter 36. Any noise appearing on the edges of the incoming PCM pulses is removed by accurate sampling in the decombiner 4 with narrow 1152 kc. pulses present on the conductor 18, enabling operation at low signal-to-noise ratios. This requires that the tuned circuit 9 output remains fixed with respect to the phase of the incoming PCM. To prevent phase shift due to temperature changes, component changes, and other such changes, the signal input to tuned circuit 9 is compared to the output of gate 35 by means of phase detector 37. This comparison is accomplished by the output of generator 34 being coupled to the gate 35 and hence to the low impedance phase splitter 36. The 1152 kc. base signal from phase splitter 36 is applied through conductor 40 to the input of the timing generator 3, phase detector 37, and the conductor 18. An identical voltage of reversed polarity is obtained from phase splitter 36 for conduction along conductor 41 for application to the phase detector 37. Thus, these balanced 1152 kc. square wave voltages of opposite polarity and the synchronizing pips from delay unit 18*a* having a negative polarity are fed to the phase detector 37 for comparison therein and derivation of D.-C. error voltages of proper polarity and magnitude dependent upon the phase condition present. This resultant D.-C. voltage is applied to a motor drive unit 38 which adjusts the resonant frequency of the tuned circuit 9 by means of a mechanically operated condenser in such a manner as to compensate for the phase shift.

The 1152 kc. pulses of Curve T fed to the timing generator 3 from conductor 40 are divided down to 8 kc. pulses. The pulses of Curve T are reduced in scale with respect to the same pulses of Curve F to facilitate the illustration of the counting down operation. The basic unit of the timing generator 3 is a conventional flip-flop circuit. When simply connected, a flip-flop will divide by two. However, in two portions of the circuit, division by three is necessary which is accomplished by the appropriate arrangement of a feedback circuit to be described hereinbelow.

The 1152 kc. pulses of Curve T applied to unit 43 are amplified and coupled to a first flip-flop through a pair of crystal diodes and a capacitive-resistive type of differentiating circuit whose output consists of narrow negative and positive pulses. The polarity of the coupling crystals is arranged such that only the negative pulses can act as a trigger. Thus the negative-going edge of the 1152 kc. square wave will operate this first flip-flop, the positive edge having no effect, the same action being present in all other flip-flops contained in the timing generator 3. The resultant output therefrom consists of a 576 kc. square wave which is amplified and applied to a further divider or counter-circuit consisting essentially of a second and third flip-flop and a single-stability multivibrator, the output of the multivibrator besides being sent on to the remaining portions of the timing generator 3 is fed back to the second flip-flop such that the output pulse of the multivibrator is timed to appear midway between two of the input pulses applied to the second flip-flop. This feedback arrangement provides the means for division by three and the timing of the multivibrator is determined by the time constants therein to produce a waveform consisting of 1 microsecond pulses occurring at a 192 kc. rate.

The 192 kc. pulses of Curve U from the third flip-flop mentioned hereinabove, are coupled to unit 44 wherein these 192 kc. pulses are divided down to 96 kc. by a fourth flip-flop. These 96 kc. pulses are acted upon by a 3-to-1 divider including a fifth and sixth flip-flop and a multivibrator for division down to 32 kc., the operation of this divider being the same as the 3-to-1 divider mentioned hereinabove. A seventh flip-flop divides this signal down to a 16 kc. pulse while an eighth flip-flop divides this signal down to 8 kc. The trailing edge of this 8 kc. square wave rings a tuned circuit in the plate of a pipped generator while a crystal diode employed therein removes the negative pulse of the oscillator. These resulting narrow pulses are gated with the 192 kc. pulses from the last amplifier in the divider unit 43 in a coincident gate device. This keyed frame-rate output is amplified and coupled to the framing circuit 2*a*, the pulses being substantially as shown in Curve V.

The timing of these output pulses is thus determined by that of the incoming 1152 kc. pulses. It will be apparent to those skilled in the art that if the division process is done at a random time, the 8 kc. pulses will assume and maintain a timing with respect to the incoming PCM pulses which has been randomly determined. Since there is only one correct position of the 8 kc. pulse out of 144 possible positions, a framing circuit 2*a* is included to enable timing generator 3 dividers or counters to slip to the proper time position.

The framing circuit 2*a* operates in conjunction with the synchronizing circuit 2 to remove one 1152 kc. pulse on the average of every other frame from the train of 1152 kc. pulses at gate 35 if the outputs of circuit 2 are not framed to the incoming PCM signal. Consider one frame, 144 0.868 microsecond pulse positions, in which there is one 1152 kc. pulse missing. The first timing generator flip-flop in unit 43 is fired by the negative-going edge of the 1152 kc. pulse. When a pulse is extracted from the 1152 kc. pulse signal, this flip-flop will wait one pulse position before firing again, thus the output of this flip-flop will start one pulse position later than previously. Similarly, the 8 kc. output pulse will occur one pulse position later than in the previous frame. As long as there is a 1152 kc. pulse missing, this slipping process will continue. The 8 kc. pulse from unit 44 is employed to sample the incoming PCM in such a manner that as long as the pulse position examined by the 8 kc. pulse is not the framing pulse, a 1152 kc. pulse of Curve I will be removed, such as indicated in Curve K by the dotted pulse, shown dotted herein since the curves throughout Figs. 3A and 3B are actually for a synchronized and framed condition. However, if unframed as herein described, pulse 45 may be removed in a manner hereinbelow explained. When the framing pulse occurs simultaneously with the 8 kc. pulse, as indicated in Curves L and M, the extraction circuits which remove the 1152 kc. pulse cease to operate, the timing generator 3 counters cease to slip, and the system is in frame. From this time on, the time position of the 8 kc. pulse is constant with respect to the incoming PCM. The framing pulse herein referred to is a pulse which is modulated at a synchronous 4 kc. rate by the distant modulator, for presence or absence in alternate frames. It is preferred that this framing pulse appear in the position of the minimum weight pulse of channel 24 in group B.

The channel group B pulses, containing the framing information, are coupled from decombiner 4 by conductor 46 to the phase splitter 47. From the phase splitter 47 two outputs are derived, one is a channel group B pulse train having a positive polarity, as seen in Curve L, applied to the coincident gate 48 and the other is a channel group B pulse train having a negative polarity, as seen in Curve O, applied to coincident gate 49.

The incoming 8 kc. frame-rate pulse from timing generator 3 is applied to flip-flop 51 and delay line 50. The frame-rate pulses are delayed by delay line 50 to sample in the center of the channel group B pulses. The output of delay line 50, substantially as indicated in Curve M, has a predetermined amount of delay with respect to Curve N, the frame-rate from pulse generator 3, and a width of approximately 0.2 microsecond. This delayed frame-rate pulse is then applied simultantously to gates 48 and 49.

If the pulse position sampled by gate 48 contains a pulse in a particular frame, the output is one narrow pulse in this frame, as seen in Curve P. Since the pulses applied to gate 49 are reversed in phase with respect to the pulses applied to gate 48, there is no output from gate 49 for this particular pulse position as shown in Curve C. When there is no pulse in the pulse position sampled by gate 48 no output will appear but an output pulse will appear from gate 49. If the sampled pulse position is the framing pulse position, the preceding operation results in output pips from alternate gates in alternate frames as shown in Curves P and S. For a given frame, therefore, there is always output from either gate 48 or 49, but never from both simultaneously. Referring to Curves L, M and O in that order and in conjunction with Curves P and S of Figs. 3A and 3B, respectively, these statements may be observed pictorially.

The gate circuits 48 and 49 each contain an electron discharge device with associated circuitry to provide a reversal in polarity of the negative outputs of the actual gating devices therein producing the pulsed signal as may be observed in Curves P and S, respectively. The output from gate 48 is applied to a third coincident gate 52 while the output from gate 49 is applied to a fourth coincident gate 53. The undelayed incoming frame-rate pulse of Curve N is employed to trigger the 4 kc. half-frame rate, flip-flop 51. A 4 kc. square wave output is obtained in one polarity, such as shown in Curve Q, and is applied to gate 52 while a 4 kc. square wave of the opposite polarity, as shown in Curve R, is applied to the gate 53. The outputs of gates 52 and 53 are tied together, each of the gates being capable of conduction in alternate frames.

The output pulse therefrom, hereafter referred to as the error pulses, drives the extraction flip-flop 54. If a true error is present in framing, an output pulse from this extraction circuit 54 is amplified and formed by pulse former and amplifier 55, the output therefrom being applied to gate 35. Assuming an error, an extraction pulse of negative polarity, as indicated in Curve J, will be produced. This pulse will be coincident with one of the 1152 kc. pulses, such as pulse 45 of Curve K. The negative extraction pulse will cut off gate 35 and block pulse 45 from appearing in the output of gate 35. An amplified extraction pulse is also fed from amplifier 55 through conductor 24 to provide a control pulse for decombiner 4, the function of which has hereinabove been described.

From the above description, it will be seen that, as long as error pulses are present, the timing generator 3 will continue to slip. Referring to the outputs of gates 52 and 53, the following possible conditions may exist.

(1) The pulse position being examined does not contain the framing pulse, but contains a pulse at all times. In this condition an output signal appears from only one of the first pair of gates 48 or 49. This output signal will appear at the outputs of gates 52 or 53 as a 4 kc. error pulse. If the output signal should appear at the output of gate 48, it will be passed by gate 52 during the time the 4 kc. square wave applied thereto is positive which will occur every other frame. If the output signal appears at the output of gate 49, it will be passed by gate 53, during alternate frames. As indicated hereinabove gates 52 and 53 will conduct on only alternate frames due to the balanced 4 kc. square wave input thereto.

(2) The pulse position being examined does not contain the framing pulse or any other pulse at any time, the absence of a pulse will appear as a pulse when inverted by phase splitter 47. Since received pulses of both polarities are applied to both pair of gates, 48 and 49, output will appear from one of these gates and the observed action will be as described in condition number one.

(3) The pulse position being examined does not contain the framing pulse, but does contain a pulse at random intervals. A pulse appears at the output of either gate 48 or 49 at all times, and an error pulse will be present, the operation being as set forth in condition number one.

(4) The pulse positive being examined contains the framing pulse. Assume the framing pulse is present at the output of gate 48 at the same time the 4 kc. square wave input to gate 52 is positive. Gate 52 will conduct and an output error pulse appears, causing one pulse position of slippage. As a result, the next time a pulse position is examined it will not contain the framing pulse, and conditions one, two, or three will exist. Therefore, after a frame of slippage has occurred, the next pulse position being examined will again contain the framing pulse. However, after this one frame of slippage the relative phase between the 4 kc. framing pulse in the channel group B signal and the locally generated 4 kc. square wave will have reversed, resulting in the following condition.

(5) Assume the framing pulse is absent at the output of gate 48, the framing pulse position being examined, at the same time the 4 kc. square wave input to gate 52 is positive. Gate 52 will not conduct due to this gate being of the coincident type. In the next frame, the framing pulse is present, but now the 4 kc. square wave input to gate 52 is negative so gate 52 does not conduct. This same condition will exist for the gates 49 and 53. No conduction from either gates 52 or 53, no error pulse appears, the framing pulse has been recognized, the dividers of timing generator 3 stop slipping, and the system is framed.

(6) Any other examination will result in either condition four or five. Since condition four becomes condition five the next time the framing pulse position is examined, the system will frame, requiring only one frame of slippage to bring the system into frame. The resulting behavior of the circuits under conditions four and five will become clearer by reference to the Curves L, M, N, O, P, Q, R, and S of Figs. 3 and 3A which illustrates the waveforms present at the indicated points in the framing circuit 2a for a framed condition.

It will be apparent to those skilled in the art that there is the possibility of an occasional noise pulse causing the system to lose frame, once framing is accomplished, by generation of a false error pulse. To avoid this possibility a delayed bias circuit 56 is included at the common output of gates 52 and 53. This circuit prevents the extraction flip-flop 54 from being triggered before a predetermined number of error pulses have occurred. The delayed bias circuit 56 includes a diode which initially acts as a short circuit across the trigger pulse input to flip-flop 54. As error pulses continue to occur, a charge builds up on a capacitor incorporated therein, placing a positive bias on the diode cathode. The diode now cannot conduct until the error pulses reach a level which exceeds this bias. As the charge continues to build up, the error pulses are permitted to increase in amplitude until they reach a level sufficient to trigger flip-flop 54 and an extraction pulse is generated. Therefore, a number of error pulses must be generated to activate flip-flop 54, preventing the system from being thrown out of frame or phase by a sudden and instantaneous noise pulse.

While I have described above the principles of my invention in connection with specific apparatus, it is to be clearly understood that this description is made only by way of example and not as a limitation to the scope of my invention as set forth in the objects thereof and in the accompanying claims.

I claim:

1. A system for automatically phasing a pulse code modulation multichannel train of signal pulses, certain frames of which contain framing pulses, comprising a signal receiver to receive said train of signal pulses, synchronizing means coupled to said receiver activated by said train of signal pulses for base frequency signal production, channel separating means activated by both said base frequency signal and said train of signal pulses to cooperate in the separation of channel signals according to respective channel groupings, timing means activated by the base frequency signal output of said synchronizing means for production of frame-rate pulses, framing means coupled for phase comparison of the frame-rate pulse output of said timing means and a portion of the output of said separating means to produce an error signal and a control signal when said frame-rate pulses are non-coincident with said framing pulses, means to apply said error signal to said synchronzing means to alter the phase of the output thereof in successive frames until said frame-rate pulses coincide with said framing pulses, and means to apply said control signal to said channel separating means to control the separation of said channel signals in accordance with the phase relation between said frame-rate pulses and said framing pulses.

2. A system for automatic phasing according to claim 1, wherein said pulse code modulation signal includes two groups of N channels, the pulse positions of the channel groups being interleaved on a time basis, with a certain pulse position of a predetermined channel of one group being modulated to appear in alternate frames for transmission of the framing information.

3. A system for automatic phasing according to claim 1, wherein said receiver includes circuit means for deriving substantially constant amplitude square wave pulses from said signal pulses and for coupling said square wave pulses to said synchronizing means and said separating means.

4. A system for automatic phasing according to claim 1, wherein said timing means comprises a plurality of counting circuits for deriving said frame-rate pulses from said base frequency signal, the output therefrom being coupled to said framing means.

5. A system for automatically phasing a pulse code modulation multichannel train of signal pulses, certain frames of which contain framing pulses, comprising a signal receiver, synchronizing means activated by said train of signal pulses for base frequency signal production, channel separating means activated by both said base frequency signal and said train of signal pulses to cooperate in the separation of chanel signals according to respective channel groupings, timing means activated by the output of said synchronizing means for production of frame-rate pulses, framing means coupled for phase comparison of the output of said timing means and a portion of the output of said separating means to produce an error signal and a control signal when said frame-rate pulses are non-coincident with said framing pulses, means to apply said error signal to said synchronizing means to alter the phase of the output thereof in successive frames until said frame-rate pulses coincide with said framing pulses, and means to apply said control signal to said channel separating means to control the separation of said channel signals in accordance with the phase relation between said frame-rate pulses and said framing pulses, said receiver including circuit means for deriving substantially constant amplitude square wave pulses from said signal pulses and for coupling said square wave pulses to said synchronizing means and said separating means, said separating means comprising first coincident gate circuit, means coupling the pulse output of said receiver to said first gate circuit, a second coincident gate circuit, means coupling the pulse output of said receiver to said second gate circuit a predetermined time after said pulse output is coupled to said first gate circuit, a frequency doubling device to couple a signal to each of said first and second gate circuits having a frequency twice the frequency of said base frequency signal to cooperate in the coincident gating operation thereof, a third coincident gate circuit, a fourth coincident gate circuit, means common to the output of said first and second gate circuits, conductor means to apply the output signal of said common means to said third gate circuit, delay means coupling the output signal of said common means to said fourth gate circuit a predetermined time after the output signal of said common means is coupled to said third gate circuit, circuit means coupling said base frequency signal to each of said third and fourth gate circuits for coincident gating operation thereof, and a trigger circuit activated by the control signal of said framing means to provide a controlled coincident gating operation of said first and second gate circuits whereby the coincident operation is alternated between said first and second gate circuits.

6. A system for automatically phasing a pulse code modulation multichannel train of signal pulses, certain frames of which contain framing pulses, comprising a signal receiver, synchronizing means activated by said train of signal pulses for base frequency signal production, channel separating means activated by both said base frequency signal and said train of signal pulses to cooperate in the separation of channel signals according to respective channel groupings, timing means activated by the output of said synchronizing means for production of frame-rate pulses, framing means coupled for phase comparison of the output of said timing means and a portion of the output of said separating means to produce an error signal and a control signal when said frame-rate pulses are non-coincident with said framing pulses, means to apply said error signal to said synchronizing means to alter the phase of the output thereof in successive frames until said frame-rate pulses coincide with said framing pulses, and means to apply said control signal to said channel separating means to control the separation of said channel signals in accordance with the phase relation between said frame-rate pulses and said framing pulses, said receiver including circuit means for deriving substantially constant amplitude square wave pulses from said signal pulses and for coupling said square wave pulses to said synchronizing means and said separating means, said synchronizing means comprising a gating means including a differentiator and clipping circuit for deriving pulses from said square wave pulses indicative of the pulse position repetition frequency of said signal pulses and a coincident gate circuit activated by the output of said differentiator and clipping circuit and the base frequency output of said synchronizing means for derivation of pulses from the output of said differentiator and clipping circuit repetitious in the base frequency.

7. A system for automatic phasing according to claim 6, wherein said synchronizing means further includes a delay line for given timing of the output of said gating means, a high-Q tuned circuit including a variable condenser responsive to the output of said delay line for generation of a base frequency oscillation, a square wave generator coupled to the output of said tuned circuit for production of a square wave base frequency signal, an extraction gate responsive to said square wave base frequency signal and a pulse error signal from said framing means, each of said pulse error signals removing one of the square pulses of said square wave base frequency signal to cause slippage of the output of said timing means until said frame-rate pulses are synchronized with said framing pulses.

8. A system for automatic phasing according to claim 7, further including a phase splitter activated by said extraction gate to provide a balanced output, a phase detector coupled for phase comparison of the output of said phase splitter and the output of said delay line to produce a correction signal when said balanced outputs are non-coincident with the pulse output of said delay line, and a motor unit responsive to said correction signal and mechanically coupled to said variable condenser to alter the output of said tuned circuit.

9. A system for automatically phasing a pulse code modulation multichannel train of signal pulses, certain frames of which contain framing pulses, comprising a signal receiver, synchronizing means activated by said train of signal pulses for base frequency signal production, channel separating means activated by both said base frequency signal and said train of signal pulses to cooperate in the separation of channel signals according to respective channel groupings, timing means activated by the output of said synchronizing means for production of frame-rate pulses, framing means coupled for phase comparison of the output of said timing means and a portion of the output of said separating means to produce an error signal and a control signal when said frame-rate pulses are non-coincident with said framing pulses, means to apply said error signal to said synchronizing means to alter the phase of the output thereof in successive frames until said frame-rate pulses coincide with said framing pulses, and means to apply said control signal to said channel separating means to control the separation of said channel signals in accordance with the phase relation between said frame-rate pulses and said framing pulses, said framing means comprising a first pair of coincident gate circuits, a phase splitter responsive to said certain frames of said pulse code modulation signal to produce simultaneously a positive train of said certain frames for coupling to one gate circuit of said first pair and a negative train of said certain frames for coupling to the other gate circuit of said first pair, a delay line for delaying the application of said frame-rate pulses to trigger each gate circuit of said pair, a half-frame rate flip-flop activiated by said frame-rate pulses, a second pair of coincident gate circuits, each gate circuit of said second pair being coupled to the output of the corresponding gate circuit of said first pair and to the output of said flip-flop, said second pair being triggered into operation by the half-frame rate output signal of said flip-flop in the presence of a framing error.

10. A system for automatic phasing according to claim 9, further including an extraction circuit comprising an extraction flip-flop coupled to the outputs of said second pair for production of said error signal in the form of pulses until framing is accomplished, means coupling said error signals to said synchronizing means, means coupling said control signals to said channel separating means, and a delay bias means rendering said extraction flip-flop insensitive to random noise pulses after framing is accomplished including means to accumulate a voltage to overcome the bias of said biasing means to render said extraction flip-flop operative for production of said error signals and said control signals when framing is lost.

11. In a system for automatically phasing a pulse code modulation multichannel train of signal pulses, certain frames of which contain framing pulses, a synchronizing means comprising, a high-Q tuned circuit including a variable condenser responsive to the basic repetition frequency of said signal pulses for local generation of a base frequency oscillation, a square wave generator coupled to the output of said tuned circuit for production of a square wave base frequency signal, a timing generator for producing a frame-rate signal from said base frequency signal, an extraction gate circuit coupling the output of said square wave generator to said timing generator, and a framing circuit for phase comparison of said frame-rate signal and said framing pulses to produce an error signal when said framing pulses and said frame-rate signal are non-coincident, said extraction gate being responsive to said error signal for removing in each frame a pulse from said base frequency signal to cause a successive slippage in the output of said timing generator until framing is obtained.

12. In a system according to claim 11, further including a phase splitter activated by said extraction gate to provide a balanced output, a phase detector coupled for phase comparison to the output of said phase splitter and the input to said tuned circuit to produce a correction signal when said balanced outputs are non-coincident with the input to said tuned circuit, and a motor unit coupled to said variable condenser responsive to said correction signal to alter the output of said tuned circuit.

13. In a system for automatically phasing a pulse code modulation multichannel train of signal pulses, certain frames of which contain framing pulses, framing means comprising a first pair of coincident gate circuits, a phase splitter responsive to said certain frames of said pulse code modulation signal to produce simultaneously a positive train of said certain frames for coupling to one gate circuit of said first pair and a negative train of said certain frames for coupling of the other gate circuit of said first pair, a frequency generating device responsive to said signal pulses for the generation of frame-rate signals, a delay line for delaying the application of said frame-rate signals to trigger each gate circuit of said first pair, a half-frame rate flip-flop activated by said frame-rate signals, a second pair of coincident gate circuits, each gate circuit of said second pair being coupled to the output of the corresponding gate circuit of said first pair and to the output of said flip-flop, said second pair being triggered into conduction by the half-frame rate output signal of said flip-flop in the presence of a framing error for production of error pulses, and an extraction circuit responsive to said error pulses for production of error signals to alter the output of said frequency generating means to provide the desired framing operation for channel separation of said multichannel signal pulses according to a given channel grouping.

14. In a system for automatically phasing a pulse code modulation multichannel train of signal pulses, including two groups of N channels, the pulse positions of the channel groups being interleaved on a time basis, with a certain pulse position of a predetermined channel of one group being modulated to appear in alternate frames for transmission of the framing information, a channel group separating means comprising a first coincident gate circuit, means coupling the train of signal pulses to said first gate, a second coincident gate circuit, means coupling the train of signal pulses to said second gate circuit a predetermined time after said pulse output is coupled to said first gate circuit, a source of base frequency signal for timing the operation of said separating means in accordance with said framing information, a generator responsive to said source for producing a frame-rate signal a frequency doubling device responsive to said base frequency signal to couple a signal to each of said first and second gating circuits having a frequency twice the frequency of said base frequency signal to cooperate in the coincident gating operation thereof, a third coincident gate circuit, a fourth coincident gate circuit, means common to the output of said first and second gate circuits, conductor means to apply the output signal of said common means to said third gate circuit, delay means coupling the output signal of said common means to said fourth gate circuit a predetermined time after the output signal of said common means is coupled to said third gate circuit, circuit means coupling said base frequency signal to each of said third and fourth gate circuits for coincident gating operation thereof, a source of control signals derived from the lack of coincidence between the framing information and said frame-rate signal, and a trigger circuit activated by said control signal to provide a controlled coincident gating operation of said first and second gate circuits whereby the coincident operation is alternated between said first and second gate circuits.

References Cited in the file of this patent

UNITED STATES PATENTS

| | | |
|---|---|---|
| 2,527,638 | Kreer et al. | Oct. 31, 1950 |
| 2,527,650 | Peterson | Oct. 31, 1950 |
| 2,546,316 | Peterson | Mar. 27, 1951 |
| 2,554,112 | Libois | May 22, 1951 |
| 2,666,809 | Flowers | Jan. 19, 1954 |